United States Patent
Bourgeois et al.

(10) Patent No.: US 9,789,737 B2
(45) Date of Patent: Oct. 17, 2017

(54) TREAD WITH VARIABLE CHAMFERS

(71) Applicants: COMPAGNIE GENERALE DES ETABLISSEMENTS MICHELIN, Clermont-Ferrand (FR); MICHELIN RECHERCHE ET TECHNIQUE S.A., Granges-Paccot (CH)

(72) Inventors: Frédéric Bourgeois, Clermont-Ferrand (FR); François-Xavier Bruneau, Clermont-Ferrand (FR)

(73) Assignees: Compagnie Generale des Etablissements Michelin, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 708 days.

(21) Appl. No.: 14/363,625

(22) PCT Filed: Nov. 27, 2012

(86) PCT No.: PCT/EP2012/073670
§ 371 (c)(1),
(2) Date: Jun. 6, 2014

(87) PCT Pub. No.: WO2013/083429
PCT Pub. Date: Jun. 13, 2013

(65) Prior Publication Data
US 2014/0345764 A1 Nov. 27, 2014

(30) Foreign Application Priority Data
Dec. 8, 2011 (FR) .................................. 11 61355

(51) Int. Cl.
*B60C 11/13* (2006.01)
*B60C 11/11* (2006.01)
(Continued)

(52) U.S. Cl.
CPC ...... *B60C 11/1392* (2013.01); *B60C 11/0304* (2013.01); *B60C 11/0306* (2013.01);
(Continued)

(58) Field of Classification Search
CPC ............. B60C 11/0332; B60C 11/1392; B60C 11/0304; B60C 11/0309; B60C 11/1384;
(Continued)

(56) References Cited

U.S. PATENT DOCUMENTS 4,641,696 A * 2/1987 Semin ................. B60C 11/0302
152/209.28
5,456,301 A 10/1995 Wise
(Continued)

FOREIGN PATENT DOCUMENTS

EP 1020306 A2 7/2000
EP 1386758 A1 2/2004
JP 2010234895 A * 10/2010 ............. B60C 11/12

OTHER PUBLICATIONS

Machine translation of JP2010-234895 (no date).*
(Continued)

*Primary Examiner* — Michael H Wilson
*Assistant Examiner* — Philip N Schwartz
(74) *Attorney, Agent, or Firm* — Dickinson Wright, PLLC

(57) ABSTRACT

Tread having a plurality of generally circumferentially orientated grooves delimiting a plurality of relief elements, this tread further comprising a plurality of cut-outs in the form of transversely orientated grooves and/or slits, each relief element comprising a contact face intended to come into contact with the road and lateral faces cutting this contact face along edges intended to come into contact with a road during running, this tread having chamfers on at least a plurality of transverse edges of the relief elements, this tread having, in straight-line running, a total contact surface S (Continued)

comprising a part Sc in which all the transverse edges have chamfers and a part Snc in which all the transverse edges are free of chamfers, this tread having, in a cornering maneuver corresponding to a transverse acceleration of 0.3 g (where g is the acceleration due to gravity), a total footprint surface S* formed by a part Sc* comprising chamfers on all the transverse edges of its relief elements and a part Snc* free of any chamfer, this tread being such that the ratio Snc/Sc is equal to not more than 2% and that the ratio Snc*/Sc* is equal to or greater than 10%.

4 Claims, 3 Drawing Sheets

(51) Int. Cl.
  *B60C 11/12* (2006.01)
  *B60C 11/03* (2006.01)
(52) U.S. Cl.
  CPC ........... *B60C 11/0332* (2013.01); *B60C 11/11* (2013.01); *B60C 11/12* (2013.01); *B60C 11/1384* (2013.01); *B60C 11/0302* (2013.01)

(58) Field of Classification Search
  CPC ..... B60C 11/0306; B60C 11/11; B60C 11/12; B60C 11/0302
  USPC .............................. 152/209.8, 209.9, 209.28
  See application file for complete search history.

(56) References Cited

U.S. PATENT DOCUMENTS

| | | |
|---|---|---|
| 6,405,772 B1 | 6/2002 | Suzuki et al. |
| 6,588,472 B2 * | 7/2003 | Pirotte .................... B60C 9/30 152/209.8 |
| 2002/0112800 A1 | 8/2002 | Suzuki et al. |
| 2005/0072505 A1 | 4/2005 | Takahashi |

OTHER PUBLICATIONS

PCT/EP2012/073670, International Search Report (ISR), Form PCT/ISA/210, dated Feb. 21, 2013 (including English translation), 5 pgs.

* cited by examiner

COUPE SELON II-II

TREAD WITH VARIABLE CHAMFERS

This application is a 371 national phase entry of PCT/EP2012/073670, filed 27 Nov. 2012, which claims benefit of FR 1161355, filed 8 Dec. 2011, the entire contents of which are incorporated herein by reference for all purposes.

BACKGROUND

1. Field

The present disclosure relates to tire treads for vehicles and notably to the geometries of the grooves and slits provided in these treads.

2. Description of Related Art

There is a known way of providing a tread of a tire intended to be fitted on a vehicle with a plurality of circumferentially and transversely orientated grooves, these grooves delimiting a plurality of blocks forming a tread pattern. This tread comprises a rolling surface adapted to come into contact with a road while the tire is running. Each block comprises a contact face forming part of the rolling surface of the tread and lateral faces delimiting the grooves. These lateral faces cut the contact face at edges.

In the context of certain uses or applications, there is a known way of increasing the adhesion of these treads by providing at least some of these blocks with slits whose depth may be substantially identical to the depth of the grooves or, in some applications, may be chosen with a depth which is less than the depth of the grooves. Thus the tread comprises a plurality of edges of material, these edges being formed by the intersection of the grooves and slits with the rolling surface of the tread. Because of the presence of slits, it is possible to increase the number of edges without excessively reducing the rigidity of the tread and without excessively increasing the volume of voids in this tread.

There is also a known method, described in EP 1074405 and WO2002102611, of forming a chamfered part on the walls delimiting the transversely orientated grooves and slits, in the vicinity of the contact faces of the blocks of the tread. In the present application, the term "chamfer" denotes a flat part inclined with respect to the lateral face, which it extends up to the contact face, and also a curved part that may be tangentially connected to one or other of said faces, or to both faces. A chamfer is defined by a height, measured on the lateral face, and a width, the latter dimension being measured on the contact face. These chamfers may modify the edges formed by the grooves and slits.

These chamfers are useful in that they improve the mechanics of the contact of each block with the road, at least in the new state, and notably on roads covered with water in rainy weather. The chamfers modify the way in which the edges of the contact faces of the blocks of the tread pattern come into contact with the road during running in a straight line. Although these chamfers do not remain as permanent features during the wearing of the tread, they have been found to be particularly useful when the tire is new, that is to say when the tire has not yet been used for running. It has also been found that these chamfers could be self-maintaining or even self-regenerating, notably in emergency braking.

A substantial improvement of braking performance has been found in tires provided with treads having chamfers.

These chamfer arrangements provide high performance in straight-line running, since there is little change in the shape of the footprint, and this shape has substantially the same effect on all the blocks of the tread, regardless of whether they are located in the median part, on the edges, or on the intermediate parts of the tread.

In use, however, it has been found that the chamfers formed on the transverse edges of the tread may create noise when running, notably when the tread is stressed in a cornering configuration.

It is known that a tire mounted on a vehicle has a footprint substantially centred on the trace of its equatorial plane when the vehicle runs in a straight line. However, during a cornering manoeuvre, it is known that there is a load transfer to the tires located on the side of the vehicle on the outside of the corner. More precisely, the load is transferred to the axially outer parts of these tires. This load transfer is manifested by a change in the shape of the tire footprints.

However good the performance of tread patterns having chamfers on the transversely orientated cut-outs may be, an emission of noise is still found during cornering, posing a problem which requires an appropriate solution.

Definitions

The reference conditions, in other words the nominal conditions, for the tire on its mounting rim, as defined by the European ETRTO standard, specify the inflation pressure corresponding to the acceptable load capacity of the tire, as indicated by its load index and its speed code. However, the conditions in which a tire is used on a vehicle differ from the reference or nominal conditions in that the load carried is about 80% of the maximum acceptable load as specified by the reference conditions.

The road contact footprint of the tire is determined with the tire stationary and mounted on its mounting rim, in the conditions of use. The total contact surface of the tire in the straight-line running condition is denoted S, this surface being equal to the surface delimited by the outer contour of the footprint of the tire in its nominal conditions; this surface includes the void areas. The total contact surface of the tire in a cornering condition corresponding to a transverse acceleration of 0.3 g, where g represents acceleration due to gravity, is denoted S*. In these cornering conditions, the tire is inflated to the same pressure and subjected to the same load. This surface S* is equal to the total surface delimited by the outer contour of the footprint.

The proportion of voids per unit of surface of a tread pattern is equal to the ratio between the surface of the voids (essentially formed by the grooves) delimited by the relief elements (blocks and ribs) and the total surface (the contact surface of the relief elements and the surface of the voids). A low proportion of voids per unit of surface indicates a large contact surface of the tread and a small surface of voids between the relief elements.

A block is a relief element formed on a tread, this element being delimited by voids or grooves and comprising lateral walls and a contact face, the latter being intended to come into contact with the road during running.

A rib is a relief element formed on a tread, this element being delimited by two grooves. A rib comprises two lateral walls and a contact face, the latter being intended to come into contact with the road.

The term "radial direction" denotes a direction which is perpendicular to the axis of rotation of the tire (this direction corresponds to the direction of the thickness of the tread).

The term "axial direction" denotes a direction parallel to the axis of rotation of the tire.

The term "circumferential direction" denotes a direction which is tangent to any circle centred on the axis of rotation. This direction is perpendicular to both the axial direction and a radial direction.

A "cut-out" denotes either a groove or a slit, and corresponds to the space delimited by walls of material facing each other and spaced apart by an average distance, which may be zero. It is this distance that differentiates a slit from a groove; in the case of a slit, this distance is adapted to allow at least part of the opposed walls to be brought into contact during passage through the road contact area. As a general rule, this distance, for a slit intended for a passenger vehicle tire, is at most equal to 2 millimeters (2 mm) in the tire in the new state. In the case of a groove, the walls of this groove cannot come into contact with each other during running in the conditions of use.

SUMMARY

The embodiments of the present invention are intended to improve the noise performance of tires in the new state when cornering, the tires being provided with transversely orientated cut-outs on their treads.

For this purpose, the invention proposes an embodiment of a tire tread, this tread comprising a plurality of generally circumferentially orientated grooves delimiting a plurality of relief elements (blocks and/or ribs), this tread further comprising a plurality of transversely orientated cut-outs (grooves and/or slits) forming edges on the relief elements, these edges being intended to come into contact with a road during running, each relief element comprising a contact face intended to come into contact with the road and lateral faces cutting this contact face at edges, the set of contact faces of the relief elements forming a rolling surface of the tread.

This tread extends axially, on both sides of a mid-plane, called the equatorial plane, this mid-plane passing through the radially outermost points of the tread and dividing the tread into two parts of the same width, as far as the edges of the tread, these edges of the tread being defined as the axial limits of the footprint of the tire in its conditions of use in a straight line.

This tread comprises a plurality of relief elements having chamfers on at least a plurality of transverse edges of said relief elements, each chamfer being defined by an average volume corresponding to the volume of material removed with respect to the same block geometry without a chamfer (as the chamfer becomes larger, the volume of absent material increases).

In straight-line running, this tread has a total contact surface S comprising a part Sc in which all the transverse edges of the relief elements have chamfers and a part Snc in which none of the relief elements of this part have chamfers.

Under a cornering stress equivalent to a transverse acceleration of 0.3 g (where g is acceleration due to gravity), this tread has a footprint with a total surface S*, composed of a part Sc* corresponding to the total surface of the relief elements having chamfers on their transverse edges and a part Snc* corresponding to the total surface of the relief elements that are free of any chamfer.

This tread is characterized in that the ratio Snc/Sc is equal to not more than 2% and in that the ratio Snc*/Sc* is equal to not less than 10%.

Regardless of whether the tire is running in a straight line or in conditions equivalent to those of cornering, the measurement of the various surfaces Snc, Sc, Snc* and Sc* does not take the surfaces of the circumferential or longitudinal grooves into account.

In this case, the term "transverse" is to be interpreted in the wider sense to include any oblique direction, that is to say a direction forming an angle of not more than 60 degrees with the direction of the axis of rotation of the tire.

Thus, when the tire according to an embodiment of the invention is stressed in a cornering manoeuvre, the blocks having chamfers of smaller volume and those having no chamfers on the lateral part of the tread located towards the outside of the corner are further stressed in the contact of the tire with the road. It should be noted that, in the usual way, the footprint is modified when there is a change from straight-line running to cornering, taking on a trapezoidal shape shifted geometrically towards the outside of the corner, which is the location of the blocks of the part of the tread having no chamfers, or having chamfers with a smaller average volume than the chamfers of the blocks of the median and intermediate parts.

Preferably, the chamfers, formed along the transverse edges on at least one side of the tread with respect to the equatorial plane, are of diminishing size; that is to say, the average chamfer volumes decrease from the equatorial mid-plane towards at least one of the edges of the tread.

Advantageously, the present invention may be applied to a single side of the tire: it is simply necessary to identify, on the tire or on the tread, the side which is to be positioned nearer the outside of the vehicle on which the tire is to be mounted. This identification can be provided by special marking on the tire or its tread, this marking indicating, for example, the side that is to be placed nearer the outside of the vehicle. This arrangement can be used regardless of whether the tires used are directional or non-directional (directional tires comprising, for example, a tread requiring a specific direction of rotation and therefore a direction of running). Thus, on the part located between the equatorial plane and the outer side, the relief elements on and in the vicinity of the outer edge are free of any chamfer, whereas all the relief elements between the equatorial plane and the inner side have chamfers.

Advantageously, it is useful to arrange for the boundary between the part in which the blocks have chamfers and the part in which the blocks are free of chamfers to be marked by the formation of a circumferential slit, that is to say a cut-out which may become closed, at least partially, during passage through the road contact area.

Advantageously, the chamfers vary continuously or practically continuously between the edge of the tread to be located on the inner side of a vehicle and the edge to be on the outer side of the vehicle.

Other characteristics and advantages of embodiments of the invention will be made clear by the following description provided with reference to the appended drawings, which show, by way of non-limiting examples, variant embodiments of what is proposed by the invention.

DETAILED DESCRIPTION OF SPECIFIC EMBODIMENTS

Figure 1:
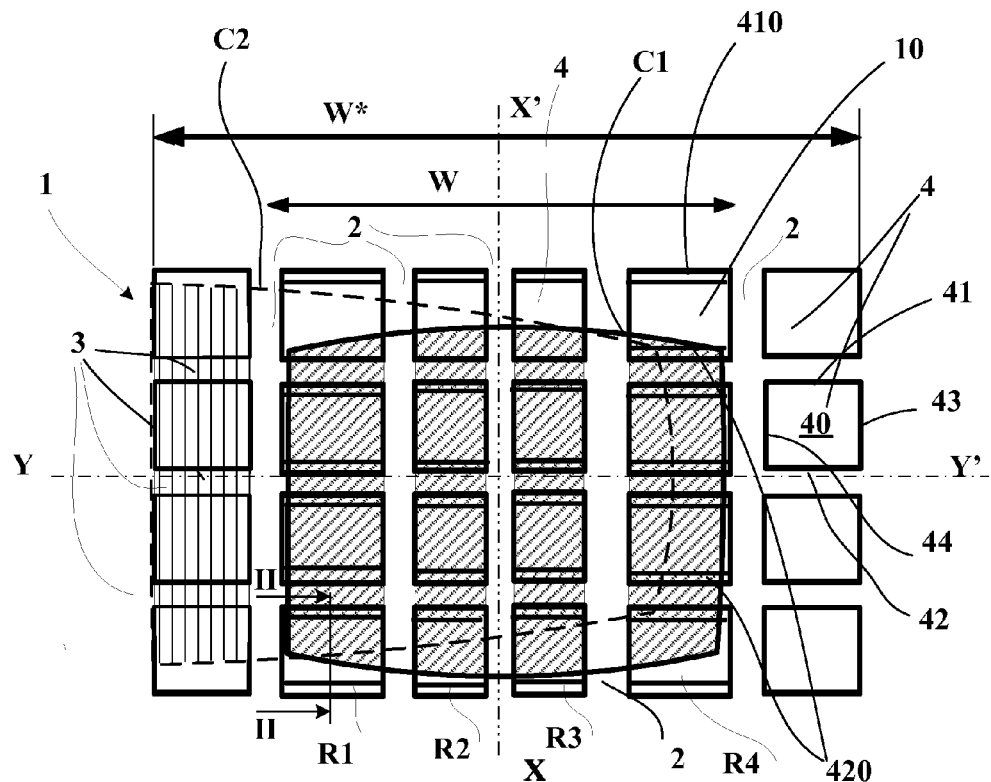
FIG. 1 shows a plan view of part of a tread according to an embodiment of the invention.

In the drawings accompanying this description, the same reference symbols may be used to describe variants of the invention where these reference symbols signify elements which are of the same kind in respect of their structure or function.

FIG. 1 shows a plan view of part of a tread 1 according to an embodiment of the invention. This tread comprises a plurality of circumferential grooves 2 and transverse grooves 3 which delimit a plurality of blocks 4. Each block 4 comprises a contact face 40 forming part of a rolling surface 10 intended to come into contact with a road during running. Each block 4 further comprises four lateral faces cutting the contact face at edges 41, 42, 43, 44. The direction XX' traced on the drawing indicates the direction of movement of the vehicle fitted with this tire; this line XX' also corresponds to the projection of the equatorial plane in the footprint. The contour C1 of the footprint of the tire in straight-line running conditions, in the conditions of use of the tire (in terms of pressure and load), is shown in solid lines, superimposed on this tread shape.

The axial width of the footprint in the straight-line running conditions is denoted W. The axial distance separating the maximum boundaries of possible contact of this tread in the cornering condition is denoted W*. The invention provides for the relief elements on the parts of the tread on either side of the width W to be entirely free of any chamfer.

Figure 2:
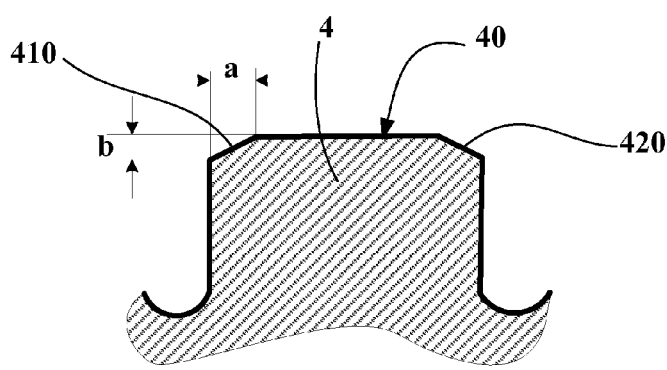
FIG. 2 shows a cross section through a block of the tread according to FIG. 1.

This contour C1 of the total footprint surface S contains four rows R1, R2, R3, R4 of blocks 4 distributed on each side of the equatorial mid-plane. On all the blocks of these four rows, the edges 41, 42 of the blocks parallel to the axis of rotation (represented in this case by an axis YY' perpendicular to the axis XX') have identical chamfers 410, 420, regardless of the block concerned. These chamfers are flat in shape, as can be seen in FIG. 2, which shows a section through a block 4 taken along a section line II-II in FIG. 1. FIG. 2 shows the dimensions of a chamfer in terms of its sides a and b, respectively, in a direction parallel to the contact surface 40 of the block and in a direction parallel to a lateral face of the same block.

In straight-line running, this tread has a total footprint surface S comprising a part Sc, corresponding to the surface in contact of all the blocks whose transverse edges have chamfers, and a part Snc corresponding to the contact surface in the footprint of the blocks whose transverse edges are free of chamfers. These two surfaces Sc and Snc are measured without taking into account the equivalent surfaces of the circumferential grooves 2, but taking into account the equivalent surfaces in the footprint of the transverse grooves 3. To illustrate the method of evaluating the surface Sc, said surface has been hatched with oblique hatchings in FIG. 1.

Here, the ratio Snc/Sc is equal to zero, because in the present case all the blocks passing through the footprint in straight-line running have chamfers on their transverse edges (corresponding to what are called the leading edges, for those making the first contact during running, and those called trailing edges, for those which are the last to move out of contact).

FIG. 1 also shows a contour C2 in dotted lines indicating the contour of the footprint of the same tire in the same conditions of pressure and load (corresponding to the conditions of use) and in a configuration equivalent to that of cornering under a transverse acceleration equivalent to 0.3 times the acceleration due to gravity (denoted "g").

Under this acceleration of 0.3 g, the tire develops a footprint with a contour C2 which is shifted axially outwards with respect to the median axis XX'; under this transverse stress, fewer of the blocks of the median part are stressed in contact, while blocks located on the edge of the tread that is axially nearer the outside of the corner enter the contact region. According to the invention, these blocks of the edge row, which are in the footprint only when the tire is cornering, are free of any chamfer on their transverse edges.

Additionally, in equivalent conditions, this tread has a total footprint surface S* comprising a part Sc*, corresponding to the surface all the blocks whose transverse edges have chamfers, and a part Snc*, corresponding to the surface of all the blocks whose transverse edges are free of chamfers. These two surfaces Sc* and Snc* are measured without taking into account the equivalent surfaces of the circumferential grooves, but taking into account the equivalent surfaces in the footprint of the transverse grooves. To illustrate the method of evaluating the surface Snc*, said surface Snc* has been hatched with vertical hatchings in FIG. 1.

In this case, the ratio Snc*/Sc* is equal to 20%.

Figure 3:
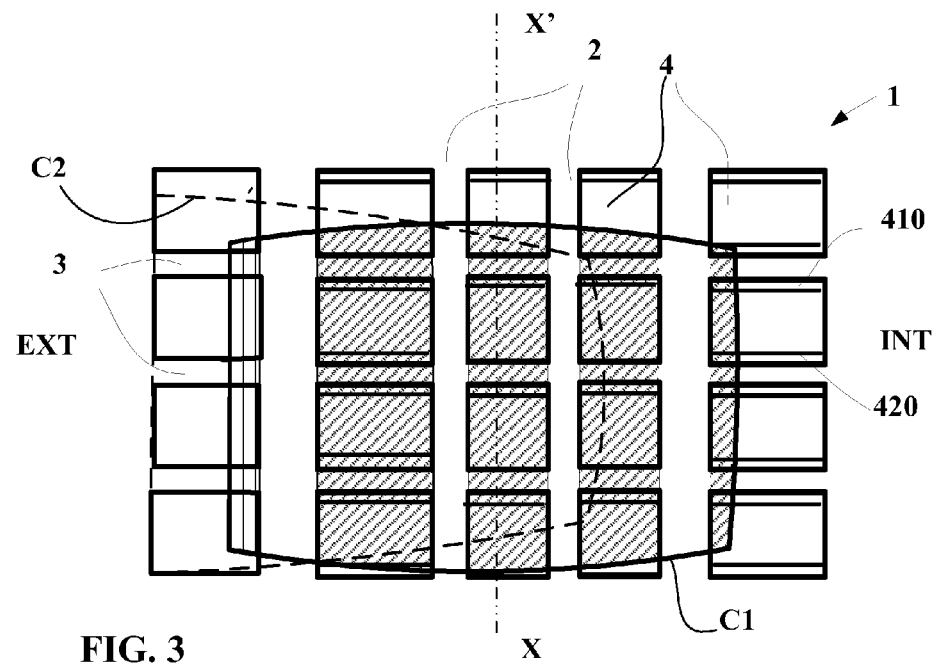
FIG. 3 shows a plan view of part of a tread according to an embodiment of the invention in which only the side intended to be placed on the outside of the vehicle is affected by a variation in the chamfers.

FIG. 3 shows a plan view of part of a tread of a tire according to an embodiment of the invention in which only the blocks on the edge located on the side intended to be placed on the outside of the vehicle are free of chamfers.

In FIG. 3 the tread 1, like the tread of FIG. 1, comprises a plurality of blocks 4 delimited by circumferential grooves 2 and transverse grooves 3.

The contour C1 of the tire footprint in straight-line running conditions (shown in solid lines) and the contour C2 of the tire footprint in conditions equivalent to those of right-hand cornering under 0.3 times the acceleration g due to gravity have been superimposed on FIG. 3.

The tire having this tread has a mounting direction, indicated, for example, on one of its sidewalls by an appropriate marking indicating, for example, which sidewall is to be positioned nearer the outside of the vehicle when the tire is mounted on one of the axles of a vehicle (the side to be placed on the outside is identified by the letters "EXT", while the other side is identified by the letters "INT").

In this variant, all the blocks between the equatorial plane XX' and the axially innermost edge (INT) of the tread have chamfers 410, 420 of identical geometry, while only some of the blocks between the equatorial plane XX' and the other edge on the "(EXT)" side have chamfers, the axially outermost blocks having none.

These two surfaces Sc and Snc are measured without taking into account the equivalent surfaces of the circumferential grooves 2, but taking into account the equivalent surfaces in the footprint of the transverse grooves 3. To illustrate the method of evaluating these surfaces, the surface Sc has been hatched with oblique hatchings, and the surface Snc has been hatched with vertical hatchings in FIG. 3.

In this variant, the ratio Snc/Sc is equal to 5%.

FIG. 3 also shows the contour C2, in dotted lines, of the footprint in conditions equivalent to those of cornering under a transverse acceleration of 0.3 g). In these conditions, this tread 1 has a total footprint surface S*, composed of a part Sc*, corresponding to the surface of all the blocks whose transverse edges have chamfers, and a part Snc*, corresponding to the surface of all the blocks whose transverse edges are free of chamfers. In this case, the ratio Snc*/Sc* is equal to 10%.

Figure 4:
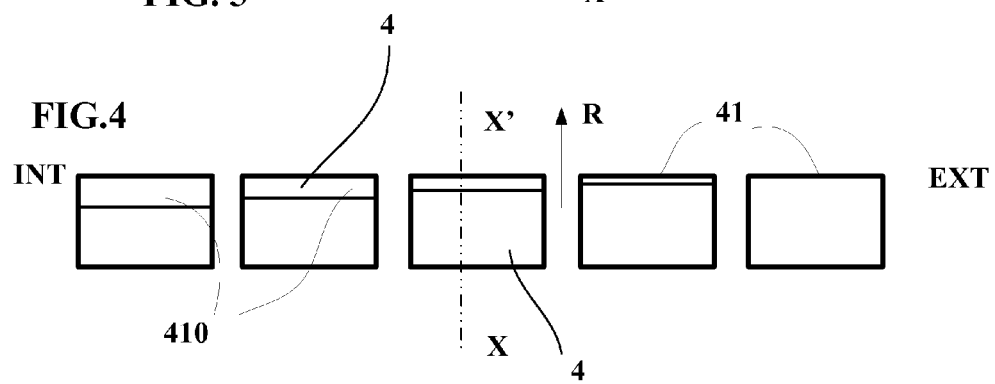
FIG. 4 shows a distribution of chamfers on the blocks of a tread according to an embodiment of the invention.

FIG. 4 shows a variant distribution of chamfers 410 on an axial row of blocks 4 of a tread according to an embodiment of the invention. In this variant, the tread has a preferred direction of mounting and rotation. As in the case of the tread of FIG. 3, it comprises an axial edge to be positioned on the outside of the vehicle (marked EXT) and an edge to be positioned on the inside (INT). The tread according to this variant comprises, on its blocks 4, a single chamfer 410 on the leading edge 41 (the edge of the bock 4 making the first contact with the road during running). The direction of rotation is indicated by the arrow R in the drawing. This tread is therefore intended to be placed in the front right-hand position on a vehicle axle. This chamfer varies by a small extent from one block to the next, from the INT edge to the EXT edge. The largest of these chamfers is located on the INT edge. On the blocks on the EXT edge, there are no chamfers (the leading and trailing edges are called "sharp").

Thus, by causing the volumes of the chamfers to decrease from the INT edge to the EXT edge of the tread, the weight of the chamfers present in contact during cornering can be reduced further, and the running noise when the tread is under a transverse load can also be reduced.

Figure 5:
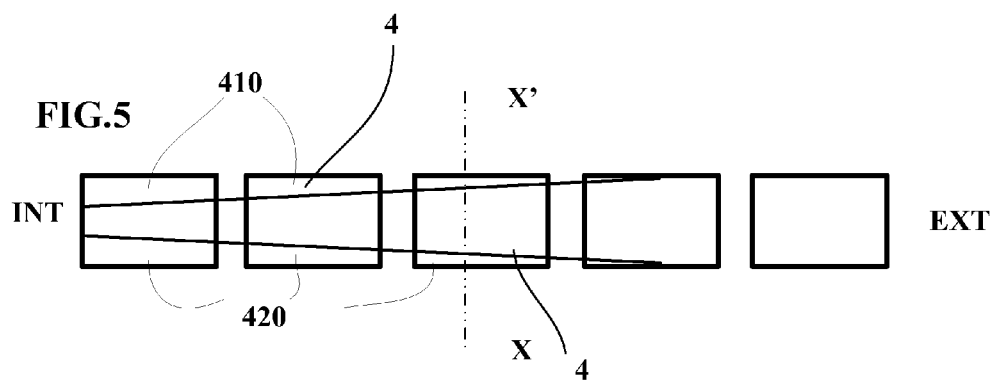
FIG. 5 shows another distribution of chamfers on the blocks of a tread according to an embodiment of the invention.

FIG. 5 shows a variant very similar to that described with reference to FIG. 4. In this variant, the tread also includes an axial edge intended to be placed on the outside (EXT) with respect to the vehicle and an inner edge (INT). The set of blocks 4 on the inner side have chamfers 410, 420 on the transverse edges (on the leading and trailing edges respectively), these chamfers being variable in each block in such a way that, from the INT edge to the EXT edge, they decrease progressively until they reach zero in the middle of the penultimate block before the edge of the outermost row.

Figure 6:
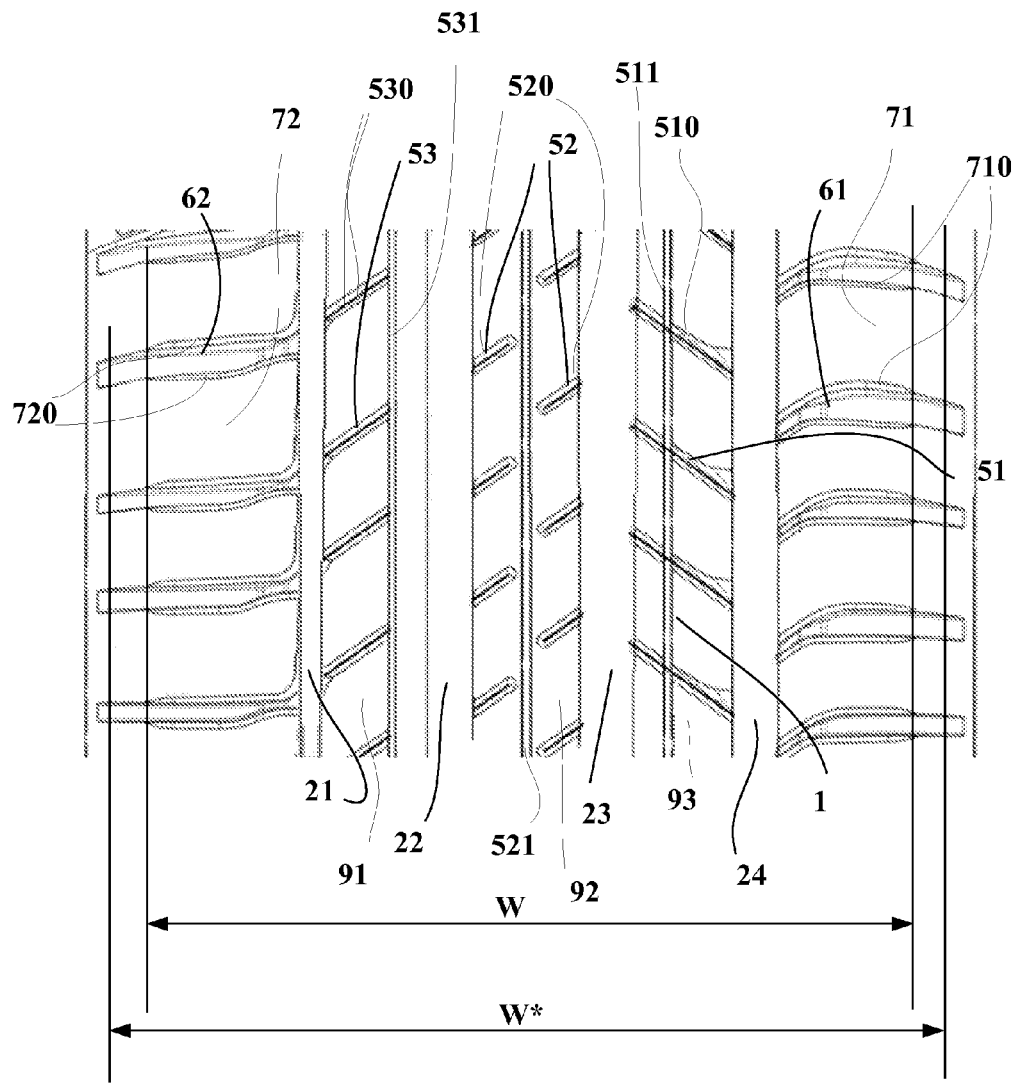
FIG. 6 shows another variant of a tread according to the invention.

FIG. 6 shows part of a tread of a tire with a size of 255/55 R 18. This tread, with an asymmetrical, directional geometry, comprises four circumferential main grooves 21, 22, 23, 24 delimiting three circumferential ribs 91, 92, 93, in the median part of the tread, and axially outer edge rows 71, 72. Each of the ribs has a small circumferentially orientated groove 511, 521, 531 whose depth is less than the depth of the circumferential main grooves.

One of the two ribs axially outside the median part has oblique slits 51 running through the whole of this rib 93.

The other two ribs 91, 92 have slits 52, 53 which open into a circumferential main groove on one side only.

All these slits 51, 52, 53 form, on the rolling surface of the tread, edges with chamfers 510, 520, 530 measuring 1.5 mm by 1.5 mm (corresponding to the formation of a plane inclined at 45°). These slits are orientated so as to give the tread a preferred running direction.

This tread also comprises, on each of its axial edges, a row 71, 72 of blocks delimited circumferentially by a plurality of transverse grooves 61, 62 respectively. The leading and trailing edges of the blocks of the edge rows 71, 72 are only partially provided with chamfers 710, 720 having the same dimensions as the chamfers of the slits in the intermediate ribs. These chamfers 710, 720 on the edge blocks are variable within each block, and disappear at and beyond a given axial width.

FIG. 6 shows the width W, corresponding to the width on the tread within which all the transverse or oblique edges have chamfers, and the width W* of the maximum road contact area of the tread in cornering running conditions. At points axially beyond the width W, the edges of the blocks are free of any chamfer. The width W for this tire is equal to 206 mm, while the maximum contact width in cornering is equal to 228 mm.

The width of the footprint in straight-line running is equal to 220 mm, and is measured on flat ground in the following conditions of use, defined on the basis of the reference conditions for this tire as given by the ETRTO standard:

Rim mounting: 8J18
Pressure: 2.3 bar
Load: 80% of "Load Index 105" defined by the ETRTO standard, i.e. 740 kg For this tire in these conditions, the following footprint surfaces are measured (according to the method mentioned above with reference to FIGS. 1 and 3):

$Sc=339.2$ mm$^2$
$Snc=2.7$ mm$^2$ This surface is not zero in the present case, because some of the footprint partially covers the blocks on the edges of the tread lying axially beyond the end of the chamfers. The width of the footprint in straight-line running conditions is equal to 214 mm here (slightly greater than the width W which is equal to 206 mm).

In this case, the ratio Snc/Sc is equal to 0.7%.

In cornering conditions, corresponding to a transverse acceleration of 0.3 g, and for a speed of 100 km/h, a pressure of 2.3 bar, and a load of 740 kg, we find:

$Sc^*=233.8$ mm$^2$
$Snc^*=32.64$ mm$^2$

In the present case, the ratio Snc*/Sc* is equal to 14%.

Tests on a vehicle were conducted, during which the driver changed direction at a constant speed of 100 km/h, following a sinusoidal path. During this test, the contact noise of the tires on the road was recorded. A comparison between a vehicle fitted with tires according to the invention and the same vehicle fitted with tires which were identical but in which there were chamfers over the whole width of the footprint revealed that tires according to the invention made it possible to reduce running noise significantly when negotiating corners.

Although the invention has been described in general terms, it is to be understood that this invention is not limited by this description and the variants described. Clearly, various modifications can be made to it without departure from the general context of the present invention. Notably, the variant shown in FIG. 6 may be modified so that the boundary between the part in which the blocks have chamfers and the part in which the blocks are free of chamfers is clearly marked by the presence of a circumferential slit, that is to say a cut-out which may become closed, at least partially, during passage through the road contact area.

The invention claimed is:

1. A tread for a passenger vehicle tire, this tread comprising:
   a plurality of generally circumferentially orientated grooves delimiting a plurality of relief elements,
   a plurality of cut-outs in the form of transversely orientated grooves or slits or both,
   wherein each relief element comprises a contact face adapted to come into contact with the road and lateral faces cutting this contact face along edges adapted to come into contact with a road during running,
   wherein the set of the contact faces of the relief elements forms a rolling surface of the tread,
   wherein the tread extends axially on either side of a mid-plane, called the equatorial plane XX', dividing the tread into two parts of the same width, and as far as edges of the tread,
   wherein the edges of the tread are defined as the axial boundaries of the footprint of the tire in its conditions of use in a straight line, wherein the tread has chamfers on at least a plurality of transverse edges of the relief elements, wherein each chamfer is defined by an average chamfer volume corresponding to the volume of material removed with respect to the same block geometry without a chamfer, wherein the tread has, in straight-line running, a total contact surface S comprising a part Sc in which all the transverse edges have chamfers and a part Snc in which all the transverse edges are free of chamfers, these two surfaces Sc and Snc being measured without taking into account the equivalent surfaces of the circumferential grooves but taking into account the equivalent surfaces of the transverse grooves in the footprint, wherein the tread has, in a cornering manoeuvre corresponding to a transverse acceleration of 0.3 g (where g is the acceleration due to gravity), a total footprint surface S* formed by a part Sc* comprising chamfers on all the transverse edges of its relief elements and a part Snc* free of any chamfer, these two surfaces Sc* and Snc* being measured without taking into account the equivalent surfaces of the circumferential grooves but taking into account the equivalent surfaces of the transverse grooves in the footprint, wherein a ratio Snc/Sc is equal to not more than 2% and wherein a ratio Snc*/Sc* is equal to or greater than 10%, and wherein the chamfers, formed along the transverse edges of at least one side of the tread with respect to the equatorial plane, are of diminishing size such that the average chamfer volumes decrease from the equatorial mid-plane towards at least one of the edges of the tread.

2. The tread according to claim 1, wherein a boundary between a part in which the blocks have chamfers and a part in which the blocks are free of chamfers is marked by the formation of a circumferential slit, which forms a cut-out which may become closed, at least partially, during passage through the road contact area.

3. The tread according to claim 1, wherein the tread has a mounting direction, indicated by a marking indicating the outer side, corresponding to the outer side of a vehicle on which the tire having said tread is intended to be mounted, and wherein, on the part located between the equatorial plane and the outer side, the relief elements on and in the vicinity of the outer edge are free of any chamfer.

4. The tread according to claim 3, wherein the chamfers vary continuously or practically continuously between the edge intended to be on the inner side and the edge intended to be on the outer side on a vehicle.

* * * * *